United States Patent
Garg et al.

(10) Patent No.: US 12,132,953 B2
(45) Date of Patent: Oct. 29, 2024

(54) IDENTIFYING AND LABELING SEGMENTS WITHIN VIDEO CONTENT

(71) Applicant: Gracenote, Inc., Emeryville, CA (US)

(72) Inventors: Amanmeet Garg, Santa Clara, CA (US); Sharmishtha Gupta, Fremont, CA (US); Andreas Schmidt, San Pablo, CA (US); Lakshika Balasuriya, Walnut Creek, CA (US); Aneesh Vartakavi, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 407 days.

(21) Appl. No.: 17/401,656

(22) Filed: Aug. 13, 2021

(65) Prior Publication Data

US 2022/0264178 A1 Aug. 18, 2022

Related U.S. Application Data

(60) Provisional application No. 63/150,023, filed on Feb. 16, 2021.

(51) Int. Cl.
*H04N 21/44* (2011.01)
*G06F 18/25* (2023.01)
(Continued)

(52) U.S. Cl.
CPC ..... *H04N 21/44008* (2013.01); *G06F 18/253* (2023.01); *G06V 20/41* (2022.01); *H04N 21/8352* (2013.01)

(58) Field of Classification Search
None
See application file for complete search history.

(56) References Cited

U.S. PATENT DOCUMENTS 9,665,789 B2 5/2017 Lee
10,581,541 B1 3/2020 Nelson et al.
(Continued)

FOREIGN PATENT DOCUMENTS

KR 10-2016-0053549 A 5/2016
KR 10-2018-0082427 A 7/2018

OTHER PUBLICATIONS

International Search Report of the International Searching Authority International application No. PCT/US2022/013239, mailed May 3, 2022, 3 pages.
(Continued)

*Primary Examiner* — Jefferey F Harold
*Assistant Examiner* — Charles N Hicks
(74) *Attorney, Agent, or Firm* — McDonnell Boehnen Hulbert & Berghoff LLP

(57) ABSTRACT

In one aspect, an example method includes (i) obtaining fingerprint repetition data for a portion of video content, with the fingerprint repetition data including a list of other portions of video content matching the portion of video content and respective reference identifiers for the other portions of video content; (ii) identifying the portion of video content as a program segment rather than an advertisement segment based at least on a number of unique reference identifiers within the list of other portions of video content relative to a total number of reference identifiers within the list of other portions of video content; (iii) determining that the portion of video content corresponds to a program specified in an electronic program guide using a timestamp of the portion of video content; and (iv) storing an indication of the portion of video content in a data file for the program.

20 Claims, 7 Drawing Sheets

(51) Int. Cl.
*G06V 20/40* (2022.01)
*H04N 21/8352* (2011.01)

(56) References Cited

U.S. PATENT DOCUMENTS

| | | |
|---|---|---|
| 2003/0091237 A1 | 5/2003 | Cohen-Solal et al. |
| 2005/0025358 A1 | 2/2005 | Qi et al. |
| 2009/0256972 A1 | 10/2009 | Ramaswamy et al. |
| 2012/0150928 A1 | 6/2012 | Ward et al. |
| 2012/0167133 A1 | 6/2012 | Carroll et al. |
| 2013/0247083 A1* | 9/2013 | Impollonia ........ G06Q 30/0275 725/14 |
| 2014/0089424 A1 | 3/2014 | Oztaskent et al. |
| 2014/0282671 A1* | 9/2014 | McMillan ........ H04N 21/44213 725/19 |
| 2016/0110877 A1 | 4/2016 | Schwartz et al. |
| 2016/0226942 A1 | 8/2016 | Bhardwaj et al. |
| 2017/0070774 A1 | 3/2017 | Bilobrov et al. |
| 2018/0007405 A1 | 1/2018 | McLean et al. |
| 2018/0121541 A1 | 5/2018 | Kalampoukas et al. |
| 2018/0199094 A1 | 7/2018 | Jeong et al. |
| 2021/0117685 A1 | 4/2021 | Sureshkumar et al. |
| 2021/0151034 A1 | 5/2021 | Hasan et al. |
| 2021/0377603 A1* | 12/2021 | Wright ............... H04N 21/2407 |
| 2022/0019809 A1* | 1/2022 | Younessian ............ G06V 20/48 |

OTHER PUBLICATIONS

Written Opinion of the International Searching Authority International application No. PCT/US2022/013239, mailed May 3, 2022, 5 pages.
International Search Report of the International Searching Authority International application No. PCT/US2022/013240, mailed May 3, 2022, 4 pages.
Written Opinion of the International Searching Authority International application No. PCT/US2022/013240, mailed May 3, 2022, 4 pages.
Non-Final Office Action mailed on Oct. 14, 2022, issued in connection with U.S. Appl. No. 17/496,297, filed Oct. 7, 2021, 16 pages.

* cited by examiner

IDENTIFYING AND LABELING SEGMENTS WITHIN VIDEO CONTENT

CROSS-REFERENCE TO RELATED APPLICATIONS

This disclosure claims priority to U.S. Provisional Patent App. No. 63/150,023 filed on Feb. 16, 2021, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In various scenarios, a content distribution system can transmit content to a content presentation device, which can receive and output the content for presentation to an end-user. Further, such a content distribution system can transmit content in various ways and in various forms. For instance, a content distribution system can transmit content in the form of an analog or digital broadcast stream representing the content.

In an example configuration, a content distribution system can transmit content on one or more discrete channels (sometimes referred to as stations or feeds). A given channel can include content arranged as a linear sequence of content segments, including, for example, program segments and advertisement segments.

Closed captioning (CC) is a video-related service that was developed for the hearing-impaired. When CC is enabled, video and text representing an audio portion of the video are displayed as the video is played. The text may represent, for example, spoken dialog or sound effects of the video, thereby helping a viewer to comprehend what is being presented in the video. CC may also be disabled such that the video may be displayed without such text as the video is played. In some instances, CC may be enabled or disabled while a video is being played.

CC may be generated in a variety of manners. For example, an individual may listen to an audio portion of video and manually type out corresponding text. As another example, a computer-based automatic speech-recognition system may convert spoken dialog from video to text.

Once generated, CC may be encoded and stored in the form of CC data. CC data may be embedded in or otherwise associated with the corresponding video. For example, for video that is broadcast in an analog format according to the National Television Systems Committee (NTSC) standard, the CC data may be stored in line twenty-one of the vertical blanking interval of the video, which is a portion of the television picture that resides just above a visible portion. Storing CC data in this manner involves demarcating the CC data into multiple portions (referred to herein as "CC blocks") such that each CC block may be embedded in a correlating frame of the video based on a common processing time. In one example, a CC block represents two characters of text. However a CC block may represent more or less characters.

For video that is broadcast in a digital format according to the Advanced Television Systems Committee (ATSC) standard, the CC data may be stored as a data stream that is associated with the video. Similar to the example above, the CC data may be demarcated into multiple CC blocks, with each CC block having a correlating frame of the video based on a common processing time. Such correlations may be defined in the data stream. Notably, other techniques for storing video and/or associated CC data are also possible.

A receiver (e.g., a television) may receive and display video. If the video is encoded, the receiver may receive, decode, and then display each frame of the video. Further, the receiver may receive and display CC data. In particular, the receiver may receive, decode, and display each CC block of CC data. Typically, the receiver displays each frame and a respective correlating CC block as described above at or about the same time.

SUMMARY

In one aspect, an example method is disclosed. The method includes (i) obtaining, by a computing system, fingerprint repetition data for a portion of video content, the fingerprint repetition data including a list of other portions of video content matching the portion of video content and respective reference identifiers for the other portions of video content; (ii) identifying, by the computing system, the portion of video content as a program segment rather than an advertisement segment based at least on a number of unique reference identifiers within the list of other portions of video content relative to a total number of reference identifiers within the list of other portions of video content; (iii) determining, by the computing system, that the portion of video content corresponds to a program specified in an electronic program guide using a timestamp of the portion of video content; and (iv) based on the identifying of the portion of video content as a program segment and the determining that the portion of video content corresponds to the program, storing, by the computing system, an indication of the portion of video content in a data file for the program.

In another aspect, an example non-transitory computer-readable medium is disclosed. The computer-readable medium has stored thereon program instructions that upon execution by a processor, cause performance of a set of acts including (i) obtaining fingerprint repetition data for a portion of video content, the fingerprint repetition data including a list of other portions of video content matching the portion of video content and respective reference identifiers for the other portions of video content; (ii) identifying the portion of video content as a program segment rather than an advertisement segment based at least on a number of unique reference identifiers within the list of other portions of video content relative to a total number of reference identifiers within the list of other portions of video content; (iii) determining that the portion of video content corresponds to a program specified in an electronic program guide using a timestamp of the portion of video content; and (iv) based on the identifying of the portion of video content as a program segment and the determining that the portion of video content corresponds to the program, storing an indication of the portion of video content in a data file for the program.

In another aspect, an example computing system is disclosed. The computing system is configured for performing a set of acts including (i) obtaining fingerprint repetition data for a portion of video content, the fingerprint repetition data including a list of other portions of video content matching the portion of video content and respective reference identifiers for the other portions of video content; (ii) identifying the portion of video content as a program segment rather than an advertisement segment based at least on a number of unique reference identifiers within the list of other portions of video content relative to a total number of reference identifiers within the list of other portions of video content; (iii) determining that the portion of video content corresponds to a program specified in an electronic program guide using a timestamp of the portion of video content; and (iv) based on the identifying of the portion of video content as a program segment and the determining that the portion of video content corresponds to the program, storing an indication of the portion of video content in a data file for the program.

DETAILED DESCRIPTION

I. Overview

Figure 1:
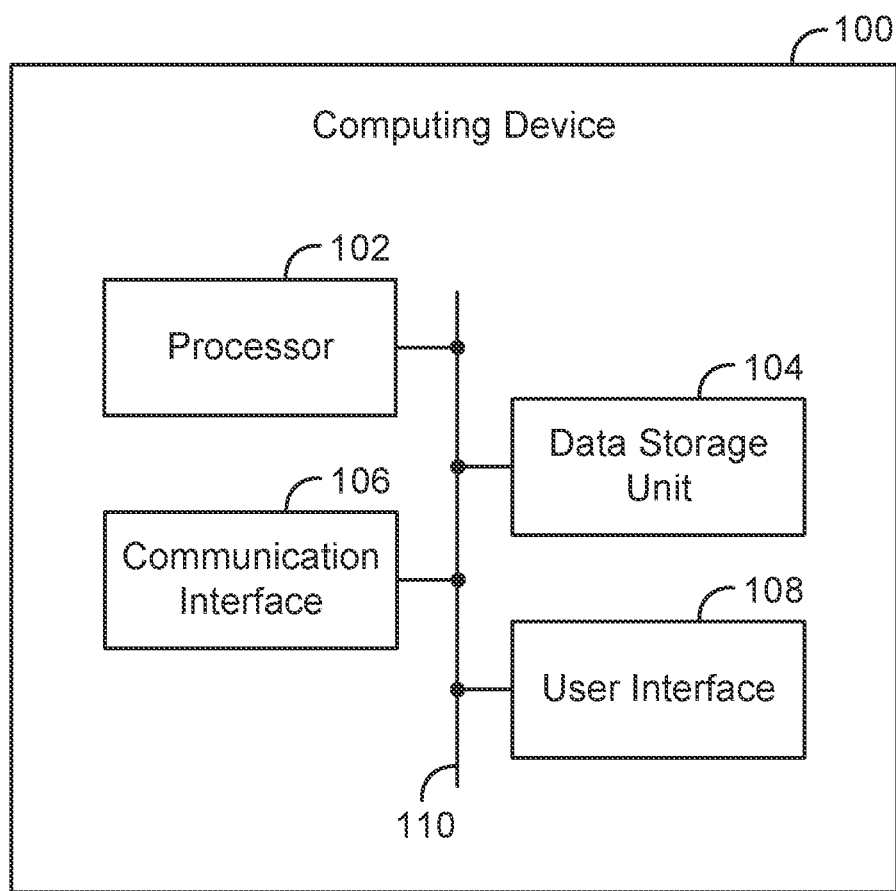
FIG. 1 is a simplified block diagram of an example computing device.

In the context of an advertisement system, it can be useful to know when and where advertisements are inserted. For instance, it may be useful to understand which channel(s) an advertisement airs on, the dates and times that the advertisement aired on that channel, etc. Further, it may also be beneficial to be able to obtain copies of advertisements that are included within a linear sequence of content segments. For instance, a user of the advertisement system may wish to review the copies to confirm that an advertisement was presented as intended (e.g., to confirm that an advertisement was presented in its entirety to the last frame). In addition, for purposes of implementing an audio and/or video fingerprinting system, it may be desirable to have accurate copies of advertisements that can be used to generate reference fingerprints.

Still further, in some instances, when media content, such as a television show, is provided with advertisements that are inserted between program segments, it may be useful to obtain a copy of the television show from which the advertisements have been removed. This can allow a fingerprinting system to more granularly track and identify a location in time within the television show when a fingerprint of the television show is obtained from the television show during a scenario in which the television show is being presented without advertisements. The television show might not include advertisements, for instance, when the television show is presented via an on-demand streaming service at a later time than a time at which the television was initially broadcast or streamed.

Disclosed herein are methods and systems for identifying and labeling segments within video content. In an example method, a computing system can obtain fingerprint repetition data for a portion of video content. The fingerprint repetition data can include a list of other portions of video content matching the portion of video content and respective reference identifiers for the other portions of video content. The computing system can then identify the portion of video content as a program segment rather than an advertisement segment based at least on a number of unique reference identifiers within the list of other portions of video content relative to a total number of reference identifiers within the list of other portions of video content. Further, the computing system can determining that the portion of video content corresponds to a program specified in an electronic program guide (EPG) using a timestamp of the portion of video content. Based on the identifying of the portion of video content as a program segment and the determining that the portion of video content corresponds to the program, the computing system can then store an indication of the portion of video content in a data file for the program.

In a similar manner, the computing system can obtain fingerprint repetition data for another portion of video content, and determine that the other portion of video content is an advertisement segment rather than a program segment using the fingerprint repetition data. Based on the identifying of the other portion of video content as an advertisement segment rather than a program segment, the computing system can obtain metadata for the advertisement segment. The computing system can then store an indication of the other portion of video content and the metadata in another data file.

In some examples, the computing system can also use other data as a basis for determining whether a portion of video content is a program segment or an advertisement segment. For instance, instead of or in addition to using the fingerprint repetition data for a portion of video content, the computing system can use closed captioning repetition data to determine whether the portion of video content is a program segment or an advertisement segment. The closed captioning repetition data can include a count of a number of times a line of closed captioning for the portion of video content occurs in closed captioning for other portions of video content. The computing system can generate features using the closed captioning repetition data, provide the features as input to a classification model. The classification model, in turn, can output classification data indicative of whether the portion of video content is a program segment or an advertisement segment.

Various other features of the example method discussed above, as well as other methods and systems, are described hereinafter with reference to the accompanying figures.

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

B. Example Computing Systems

Figure 2:
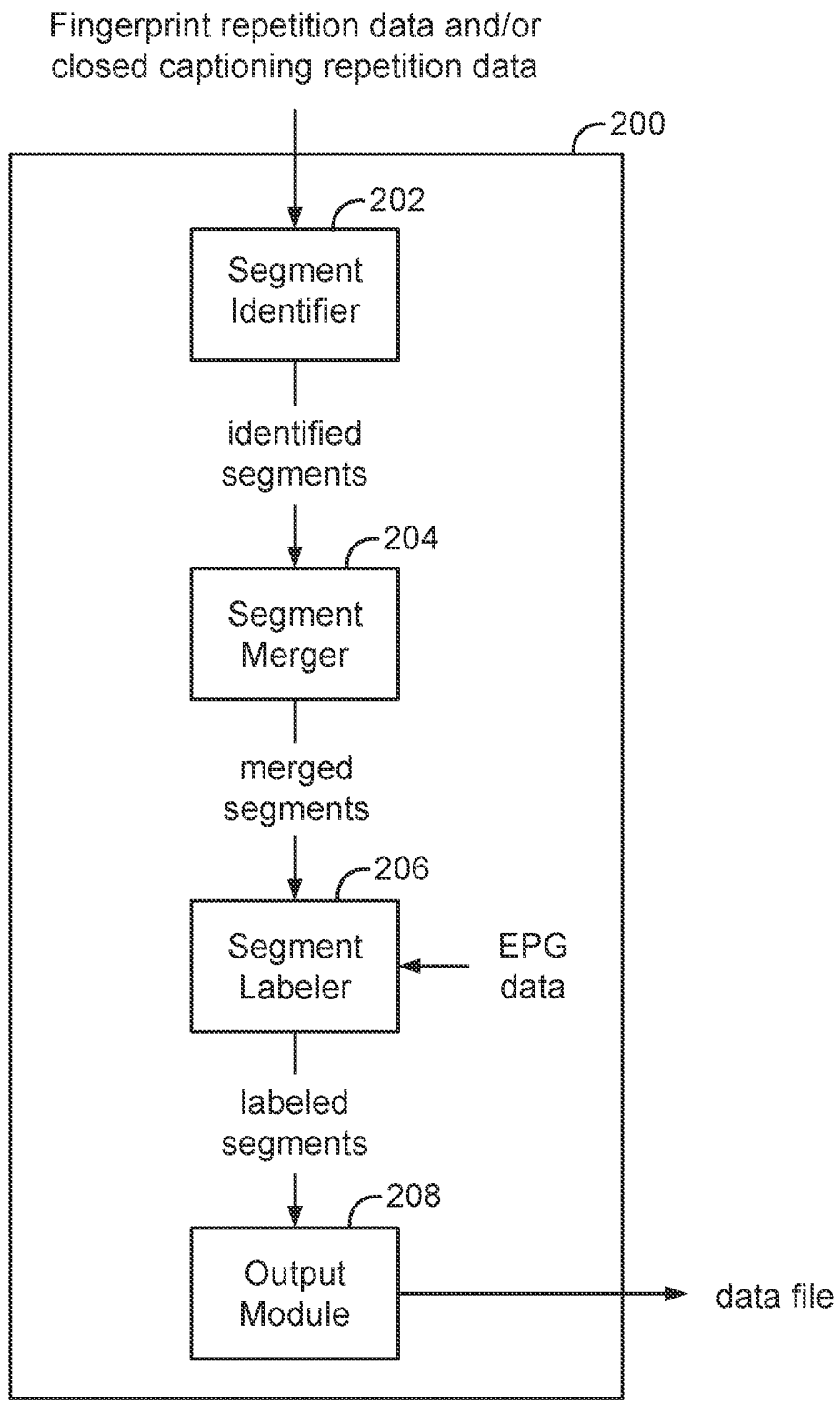
FIG. 2 is a simplified block diagram of an example computing system in which various described principles can be implemented.

FIG. 2 is a simplified block diagram of an example computing system 200. Computing system 200 can perform various acts and/or functions related to identifying and labeling portions of video content.

As shown in FIG. 2, computing system 200 can include various components, such as a segment identifier 202, a segment merger 204, a segment labeler 206, and an output module 208. Each of the segment identifier 202, segment merger 204, segment labeler 206, and output module 208 can be implemented as a computing system. For instance, one or more of the components depicted in FIG. 2 can be implemented using hardware (e.g., a processor of a machine, a field-programmable gate array (FPGA), or an application-specific integrated circuit (ASIC), or a combination of hardware and software. Moreover, any two or more of the components depicted in FIG. 2 can be combined into a single component, and the function described herein for a single component can be subdivided among multiple components.

Computing system 200 can receive fingerprint repetition data and/or closed captioning repetition data for video content, analyze the received data, and output information regarding the video content. For instance, computing system 200 can use can use fingerprint repetition data and/or closed captioning repetition data for a portion of video content to identify the portion of video content as either a program segment or an advertisement segment. If computing system 200 identifies the portion of video content as a program segment, computing system 200 can also merge the portion of video content with one or more adjacent portions of video content that have been identified as program segments. Further, computing system 200 can determine that the program segment corresponds to a program specified in an EPG, and store an indication of the portion of video content in a data file for the program. If computing system 200 identifies the portion of video content as an advertisement segment, computing system 200 can obtain metadata for the portion of video content. Further, computing system 200 can store an indication of the portion of video content and the metadata in a data file for the portion of video content.

Segment identifier 202 can receive a section of video content as input, and obtain fingerprint repetition data and/or closed captioning repetition data for one or more portions of the section of video content. For instance, the section of video content can be an hour-long video, and the segment identifier module can obtain fingerprint repetition data and/or closed captioning repetition data for multiple portions within the hour-long video.

The section of video content can include associated metadata, such as a timestamp that identifies when the section of video content was presented and a channel that identifies the channel on which the section of video content was presented. The fingerprint repetition data for a portion of video content can include a list of one or more other portions of video content matching the video content. Further, for each other portion of video content in a list of other portions of video content, the fingerprint repetition data can include a reference identifier that identifies the portion. One example of a reference identifier is a Tribune Media Services identifier (TMS ID) that is assigned to a television show. A TMS ID can be retrieved from a channel lineup for a geographic area that specifies the TMS ID of different programs that are presented on different channels at different times.

Segment identifier 202 can retrieve the fingerprint repetition data for a portion of video content from one or more repetitive content databases, such as a video repetitive content database and/or an audio repetitive content database. By way of example, a video repetitive content database can store video fingerprint repetition data for a set of video content stored in a video database. The set of video content can include videos presented on one or more channels during a prior time period (e.g., one week, one month, etc.). Further, for each of various portions within the video content, the video fingerprint repetition data can include a list of one or more other portions within the set of video content having video fingerprints that match video fingerprints of the portion. As a particular example, a portion of video content can include a ten-minute portion of a television program that has been presented multiple times on a single channel during the past week. Hence, the video fingerprint repetition data for the portion of video content can include a list that is indicative of each other time the ten-minute portion of the television program was presented. As another example, a portion of video content can include a thirty-second advertisement that has been presented multiple times during the past week on multiple channels. Hence, the video fingerprint repetition data for the portion of video content can include a list indicative of each other time the thirty-second advertisement was presented.

Similarly, an audio repetitive content database can store audio fingerprint repetition data for a set of video content. For each of various portions within the video content, the audio fingerprint repetition data can include a list of one or more other portions within the set of video content having audio fingerprints that match audio fingerprints of the portion.

In some examples, computing system 200 can carry out repetitive content analysis to determine the fingerprint repetition data. For instance, given a set of video content that is stored in a video database, the computing system can select a portion of a section of video content, generate video fingerprints for the portion of video content, and search for other portions of video content within the video database having video fingerprints that match the generated video fingerprints. By selecting many different portions of video content and repeating this process, computing system 200 can build a video fingerprint repetition database for a set of video content.

Closed captioning for video content can include text that represents spoken dialog, sound effects, or music, for example. By way of example, closed captioning can include lines of text, and each line of text can have a timestamp indicative of a position within video content.

Closed captioning repetition data for video content can be generated using a text indexer. By way of example, a text indexer can be configured to maintain a text index. The text index can store closed captioning and corresponding closed captioning metadata for a set of video content presented on a single channel or multiple channels over a period of time (e.g., one week, eighteen days, one-month, etc.). Some lines of closed captioning are repeated during the period of time. For instance, a line of closed captioning can be repeated multiple times on a single channel and/or multiple times across multiple channels. For such lines of closed captioning as well as lines of closed captioning that are not repeated, the text index can store CC repetition data, such as a count of a number of times the line of closed captioning occurs per channel, per day, and/or a total number of times the line of closed captioning occurs within the text index.

The text indexer can update the counts when new data is added to the text index. Additionally or alternatively, the text indexer can update the text index periodically (e.g., daily). With this arrangement, at any given day, the text index can store data for a number X days prior to the current day (e.g., the previous ten days, the previous fourteen days, etc.). In some examples, the text indexer can post-process the text index. The post-processing can involve discarding lines or sub-sequences of lines having a count that is below a threshold (e.g., five). This can help reduce the size of the text index.

Segment identifier 202 can be configured to retrieve closed captioning repetition data for a portion of video content from the text index. By way of example, the portion can include multiple lines of closed captioning. For each of multiple lines of the closed captioning, segment identifier 202 can retrieve, from the text index, a count of a number of times the line of closed captioning occurs in the text index. Metadata corresponding to the count can specify whether the count is per channel or per day.

In some instances, retrieving the closed captioning repetition data can include pre-processing and hashing lines of closed captioning. This can increase the ease (e.g., speed) of accessing the closed captioning repetition data for the closed captioning.

Pre-processing can involve converting all text to lowercase, removing non-alphanumeric characters, removing particular words (e.g., "is", "a", "the", etc.) and/or removing lines of closed captioning that only include a single word. Pre-processing can also involve dropping text segments that are too short (e.g., "hello").

Hashing can involve converting a line or sub-sequence of a line of closed captioning to a numerical value or alphanumeric value that makes it easier (e.g., faster) to retrieve the line of closed captioning from the text index. In some examples, hashing can include hashing sub-sequences of lines of text, such as word or character n-grams. Additionally or alternatively, there could be more than one sentence in a line of closed captioning. For example, "Look out! Behind you!" can be transmitted as a single line. Further, the hashing can then include identifying that the line includes multiple sentences, and hashing each sentence individually.

Segment identifier 202 can also identify boundaries of a portion of video content using predicted transition data for a section of video content. The predicted transition data can include predictions of segment transitions within the section of video content. Segment transitions can include transitions from program segment to program segment, from advertisement segment to advertisement segment, from program segment to advertisement segment, or from advertisement segment to program segment. For instance, for an hour-long section of video content, the prediction transition data can include predicted transitions at twelve minutes, fourteen minutes, twenty-two minutes, twenty-four minutes, forty-two minutes, and forty-four minutes. With such an example, segment identifier 202 can select the first twelve minutes of the section of video content as a portion of video content to be analyzed. Further, segment identifier 202 can also use the predicted transition data to select other portions of the section of video content to be analyzed.

The predicted transition data for a section of video content can be derived in various ways. As one example, the predicted transition data can be derived using a neural network that is trained to detect transitions between program segments and advertisement segments. As another example, the predicted transition data can be derived from detected keyframes or black frames within the section of video content. As still another example, the predicted transition data can be derived from closed captioning repetition data. Regardless of the manner in which the predicted transition data is generated, the predicted transition data can be stored in a predicted transition database. Given a section of video content to be analyzed, segment identifier 202 can retrieve predicted transition data for the section of video content from a predicted transition database.

Segment identifier 202 can use fingerprint repetition data for a portion of video content to classify the portion as either a program segment or an advertisement segment. By way of example, the segment identifier module can identify a portion of video content as a program segment rather than an advertisement segment based on a number of unique reference identifiers within the list of other portions of video content relative to a total number of reference identifiers within the list of other portions of content. For instance, the segment identifier module can identify the portion of video content as a program segment based on determining that a ratio of the number of unique reference identifiers to the total number of reference identifiers satisfies a threshold (e.g., is less than a threshold).

When the portion of video content is a program segment, the portion of video content is likely to have the same reference identifier each time the portion of video content is presented, yielding a low number of unique reference identifiers and a relatively low ratio. Whereas, if the portion of video content is an advertisement segment, and that advertisement segment is presented during multiple different programs, the portion of video content can have different reference identifiers each time the portion of video content is presented, yielding a high number of unique reference identifiers and a relatively higher ratio. As an example, a list of matching portions of video content for a portion of video content can include five other portions of video content. Each other portion of video content can have the same reference identifier. With this example, the number of unique reference identifiers is one, and the total number of reference identifiers is five. Further, the ratio of unique reference identifiers to total number of reference identifiers is 1:5 or 0.2. If any of the portions in the list of matching portions of video content had different reference identifiers, the ratio would be higher.

Segment identifier 202 can also be configured to use other types of data to classify portions of video content as program segments or advertisement segments. As one example, segment identifier 202 can be configured to use closed captioning repetition data to identify whether a portion of video content is a program segment or an advertisement segment. As another example, segment identifier 202 can be configured to identify a portion of video content as a program segment rather than an advertisement segment based on logo coverage data for the portion of video content. As another example, segment identifier 202 can be configured to identify a portion of video content as an advertisement segment rather than a program segment based on a length of the portion of video content. After identifying one or more portions of video content as program segments and/or advertisement segments, segment identifier 202 can output the identified segments to segment merger 204 for use in generating merged segments.

Segment merger 204 can merge the identified segments in various ways. As one example, segment merger 204 can combine two adjacent portions of video content that are identified as advertisement segments based on the number of correspondences between a first list of matching portions for a first portion of the two adjacent portions and a second list of matching portions for a second portion of the two adjacent portions. For instance, each portion in the first list and the second list can include a timestamp (e.g., a date and time) indicative of when the portion was presented. Segment merger 204 can use the timestamps to search for correspondences between the first list and the second list. For each portion in the first list, segment merger 204 can use the timestamp of the portion in the first list and timestamps of the portions in the second list to determine whether the second list includes a portion that is adjacent to the portion in the first list. Based on determining that a threshold percentage of the portions in the first list have adjacent portions in the second list, segment merger 204 can merge the first portion and the second portion together.

As another example, segment merger 204 can combine two or more adjacent portions of video content that are identified as program segments. As still another example, segment merger 204 can combine a first portion that is identified as a program segment, a second portion that is adjacent to and subsequent to the first portion and identified as an advertisement segment, and a third portion that is adjacent to and subsequent to the second portion and identified as a program segment together and identify the merged portion as a program segment. For instance, based on determining that the second portion that is between the first portion and the third portion has a length that is less than a threshold (e.g., less than five seconds), segment merger 204 can merge the first, second, and third portions together as a single program segment. Segment merger 204 can make this merger based on an assumption that an advertisement segment between two program segments is likely to be at least a threshold length (e.g., fifteen or thirty seconds).

In some examples, merging adjacent portions of video content can include merging portions of adjacent sections of video content (e.g., an end portion of a first section of video content and a beginning portion of a second section of video content). After merging one or more segments, segment identifier 202 can output the merged segments to segment labeler 206. The merged segments can also include segments that have not been merged with other adjacent portions of video content.

Segment labeler 206 can use EPG data to determine that a program segment corresponds to a program specified in an EPG. By way of example, for a given program identified in EPG data, segment labeler 206 can use a timestamp range and channel of the program to search for portions of video content that have been identified as program segments and match the timestamp range and channel. For each of one or more portions of video content meeting this criteria, segment labeler 206 can store metadata for the given program in association with portion of video content. The metadata can include a title of the given program as specified in the EPG data, for instance.

As a particular example, EPG data may indicate that the television show Friends was presented on channel 5 between 6:00 pm and 6:29:59 pm on March $5^{th}$. Given this information, segment labeler 206 may search for any portions of video content that have been identified as program segments and for which at least part of the portion of video content was presented during the time range. The search may yield three different portions of video content: a first portion, a second portion and a third portion. Based on the three portions meeting the search criteria, segment labeler 206 can store metadata for the given program in association with the first, second, and third portions.

Additionally or alternatively, segment labeler 206 can associate metadata with portions of video content that are identified as advertisement segments. The metadata can include a channel on which a portion of video content is presented and/or a date and time on which the portion of video content is presented. As further shown in FIG. 2, output module can be configured to receive labeled segments as input and output one or more data files. In one example, output module 208 can output a data file for a given program based on determining that the labeled segments are associated with the given program. For instance, output module 208 can determine that the labeled segments include multiple segments that are labeled as corresponding to a given program. For each of the multiple segments that are labeled as corresponding to the given program, output module 208 can then store an indication of the segment in a data file for the given program. The indication of the segment stored in the data file can include any type of information that can be used to retrieve a portion of video content from a database. For instance, the indication can include an identifier of a section of video content that includes the segment, and boundaries of the segment within the section of video content. The identifier of the section of video content can include an address, URL, or pointer, for example.

For portions of video content that are identified as advertisement segments, output module 208 can output data files that include an identifier of a section of video content from a database as well as metadata. In some instances, the data files for advertisement segments can also include information identifying that the data files correspond to an advertisement segment rather than a program segment. For instance, each advertisement segment can be assigned a unique identifier that can be included in a data file. Further, in some instances, each advertisement segment can be stored in an individual data file. In other words, there may be just a single advertisement segment per data file. Alternatively, multiple advertisement segments can be stored in the same data file.

In some examples, output module 208 can use a data file for a program to generate a copy of the program. For instance, output module 208 can retrieve and merge together all of the portions of video content specified in the data file. Advantageously, the generated copy can be a copy that does not include any advertisement segments.

Similarly, rather than generating a copy of the program, output module 208 can use the data file to generate fingerprints of the program. For instance, output module 208 can use the data file to retrieve the portions of video content specified in the data file, fingerprint the portions, and store the fingerprints in a database in association with the program label for the program. The fingerprints can include audio fingerprints and/or video fingerprints.

Additionally or alternatively, output module 208 can use a data file for a program to generate copies of video content that was presented during advertisement breaks for the program. For instance, the computing system can identify gaps between the program segments based on the boundaries of the program segments specified in the data file, and retrieve copies of video content that was presented during the gaps between the program segments.

Figure 3:
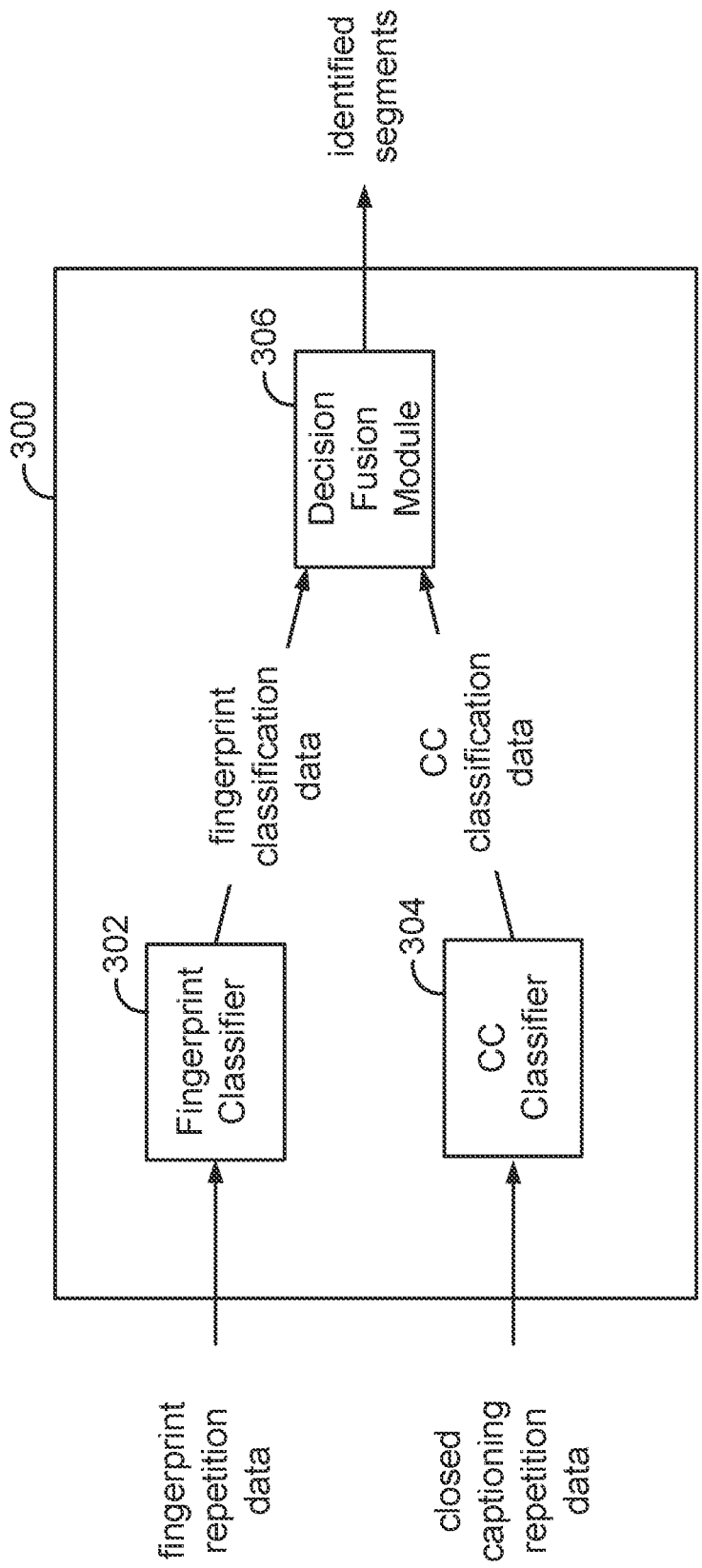
FIG. 3 is a simplified block diagram of an example segment identifier.

FIG. 3 is a simplified block diagram of an example segment identifier 300. Segment identifier 300 can perform various acts and/or functions related to identifying portions of video content. For instance, segment identifier 300 is an example configuration of segment identifier 202 of FIG. 2.

As shown in FIG. 3, segment identifier 300 can include various components, such as a fingerprint classifier 302, a closed captioning classifier 304, and a decision fusion module 306. Each of fingerprint classifier 302, closed captioning classifier 304, and decision fusion module 306 can be implemented as a computing system. For instance, one or more of the components depicted in FIG. 3 can be implemented using hardware (e.g., a processor of a machine, a field-programmable gate array (FPGA), or an application-specific integrated circuit (ASIC), or a combination of hardware and software. Moreover, any two or more of the components depicted in FIG. 3 can be combined into a single component, and the function described herein for a single component can be subdivided among multiple components.

In line with the discussion above, fingerprint classifier 302 can be configured to use fingerprint repetition data for a portion of video content to classify the portion as either a program segment or an advertisement segment. By way of example, fingerprint classifier 302 can identify a portion of video content as a program segment rather than an advertisement segment based on a number of unique reference identifiers within the list of other portions of video content relative to a total number of reference identifiers within the list of other portions of content. Fingerprint classifier 302 can also be configured to use other types of data to classify portions of video content, such as logo coverage data or data specifying lengths of the portions of video content. As shown in FIG. 3, fingerprint classifier 302 can output fingerprint classification data indicative of whether a portion of video content is a program segment or an advertisement segment. In some instances, the fingerprint classification data can include an audio fingerprint classification derived using audio fingerprint repetition data as well as a video fingerprint classification derived using video fingerprint repetition data.

CC classifier 304 can be configured to use closed captioning repetition data for the portion of video content to classify the portion as either a program segment or an advertisement segment. By way of example, CC classifier 304 can generate features from the closed captioning repetition data, and analyze the features using a classification model. For instance, the portion may be a five-second portion that includes multiple lines of closed captioning. Each line of closed captioning can have corresponding closed captioning repetition data. The closed captioning repetition data can include, for each line: a count, a number of days on which the line occurs, and/or a number of channels on which the line occurs.

CC classifier 304 can use the counts to generate features. Example features include: the counts, an average count, an average number of days, and/or an average number of channels. CC classifier 304 can also generate features based on content or characteristics of the lines of closed captioning within the portion, such as an average line length (e.g., number of characters and/or number of words) or a total number of lines within the segment. In sum, the features can include one or any combination of lines of closed captioning, raw closed captioning repetition data, features derived from lines of closed captioning, and features derived from closed captioning repetition data.

In some examples, generating the features can include transforming the closed captioning repetition data to windowed features. Transforming the closed captioning repetition data to windowed features can include generating windowed features for sub-portions of the portion using a moving window. For example, for a five-second portion, a three-second moving window can be used. With this approach, a first set of windowed features can be obtained by generating features for the first three seconds of the portion, a second set of windowed features can be obtained by generating features for the second, third, and fourth seconds of the portion, and a third set of windowed features can be obtained by generating features for the last three seconds of the portion. Additionally or alternatively, generating features can include normalizing the features.

After generating the features, CC classifier 304 can provide the features as input to a classification model. The classification model can be configured to output closed captioning classification data indicative of a likelihood of the features being characteristic of a program segment. For instance, for a set of features, the CC classification data can include a probability indicative of whether the set of features is indicative of a program segment. In an example in which multiple sets of windowed features are provided as input to the classification model, the classification model can output CC classification data for each respective set of windowed features.

Additionally or alternatively, the CC classification data can be indicative of a likelihood of the features being characteristic of an advertisement segment. For instance, for a set of features, the CC classification data can include a probability indicative of whether the set of features is indicative of an advertisement segment.

In one example, the classification model can take the form of a neural network. For instance, the classification model can include a recurrent neural network, such as a long short-term memory (LSTM). Alternatively, the classification model can include a feedforward neural network. The classification model can be trained using a training data set that includes features of segments that are known to be program segments and features of segments that are known to be advertisement segments.

Decision fusion module 306 can be configured to combine the fingerprint classification data for a portion of video content and the CC classification data for the portion of video content, and output data classifying the portion as a program segment or an advertisement segment. In an example in which the fingerprint classification data and the CC classification data agree regarding the classification of a portion of video content, decision fusion module 306 can output the classification. For instance, when both the fingerprint classification data and the CC classification data are indicative of the portion of video content being a program segment, decision fusion module 306 can output data identifying the portion of video content as a program segment. In an example in which the fingerprint classification data and the CC classification data differ, decision fusion module 306 can decide whether a portion of video content is a program segment or an advertisement segment using a confidence value output by CC classifier 304.

For instance, the fingerprint classification data can indicate that the portion of video content is an advertisement segment. At the same time, the CC classification data can indicate that the portion of video content is a program segment and that the probability of the portion of video content being a program segment is a given probability (e.g., 55%, 75%, etc.). Decision fusion module 306 can compare this probability with a threshold value (e.g., 80%). Based on determining that the probability is less than the threshold value, decision fusion module 306 can use the classification specified by the fingerprint classification data as the classification. Whereas, based on determining that the probability is greater than the threshold value, decision fusion module 306 can use the classification specified by the CC classification data as the classification.

In other instances, decision fusion module 306 can fuse the fingerprint classification data and the CC classification data using majority rules logic. For example, the fingerprint classification data can include an audio fingerprint classification and a video fingerprint classification, and the CC classification data can include a CC classification. Decision fusion module 306 can combine the audio fingerprint classification, video fingerprint classification, and a CC classification by selecting the classification which has the majority. For instance, based on the audio fingerprint classification being an advertisement segment, the video fingerprint classification being a program segment, and the CC classification being an advertisement segment, decision fusion module 306 can identify the portion of video content as an advertisement segment.

Figure 4:
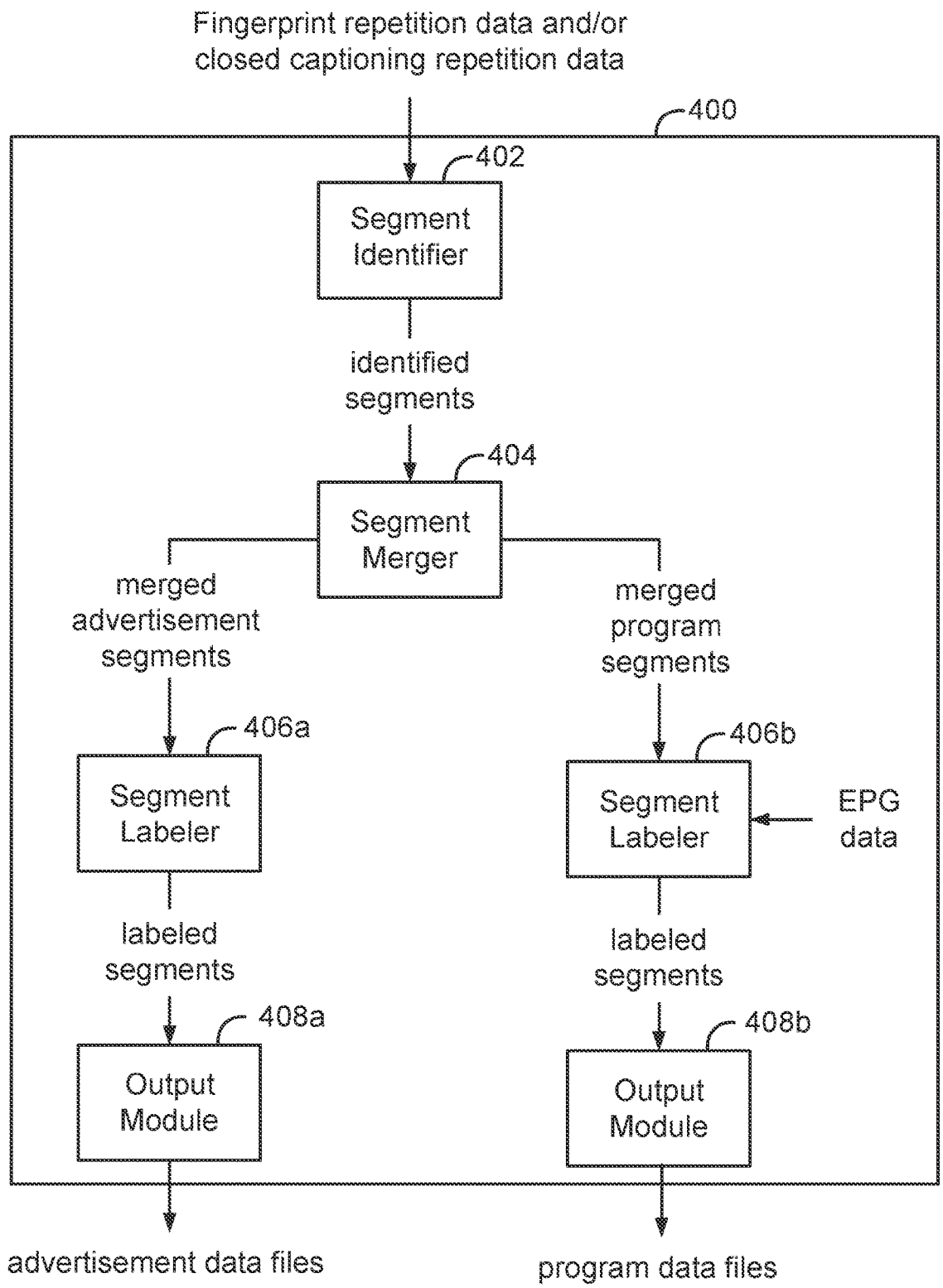
FIG. 4 is a simplified block diagram of another example computing system.

FIG. 4 is a simplified block diagram of another example computing system 400. Like computing system 200 of FIG. 2, computing system 400 can receive fingerprint repetition data and/or closed captioning repetition data for video content, analyze the fingerprint repetition data and/or closed captioning repetition data, and output information regarding the video content.

Further, like computing system 200 of FIG. 2, computing system 400 includes various components, each of which can be implemented as a computing system. More specifically, like computing system 200 of FIG. 2, computing system 400 includes a segment identifier 402 and a segment merger 404. However, unlike computing system 200 of FIG. 2, computing system 400 includes a divided architecture having two output streams. In particular, computing system 400 includes a first segment labeler 406a and a first output module 408a that form a first output stream as well as a second segment labeler 406b and a second output module 408b that form a second output stream.

The first output stream and the second output stream can operate at different timing frequencies and solve independent purposes. By way of example, the first output stream can be configured to process portions of video content that are identified as advertisement segments and the second output stream can be configured to process portions of video content that are identified as program segments. For instance, first segment labeler 406a can be configured to receive merged advertisement segments from segment merger 404, label the segments, and provide the labeled segments to first output module 408a. First output module 408a, in turn, can be configured to output advertisement data files that store data identifying advertisement segments. On the other hand, second segment labeler 406b can be configured to receive merged program segments from segment merger 404, label the segments, and provide the labeled segments to second output module 408b. Second output module 408b, in turn, can be configured to output program data files that store data identifying program segments.

In an example implementation, the first output stream can process advertisement segments in a continuous manner. For instance, after segment identifier 402 and segment merger 404 output advertisement segments, first segment labeler 406a and first output module 408a can process the advertisement segments and output advertisement data files for the advertisement segments. Further, the second output stream can process program segments in a non-continuous manner. For instance, second segment labeler 406b and second output module 408b can be configured to process program segments periodically (e.g., every three days, once a week, etc.) or in response to a request to output program data files that is received from another computing system. EPG data is often updated several days after video content is broadcast. Such updates can, for example, update timing information to account for programs that aired longer than originally expected (e.g., sporting events) or account for last-minute changes to program content. By processing program segments in a delayed manner, computing system 400 can increase the accuracy of the program data files output by second output module 408b.

In some examples, based on receiving a request to update a set of program data files, computing system 400 can cause segment labeler 406b to retrieve updated EPG data, and re-label the program segments. Second output module 408b can then output updated program data files that account for any changes reflected in the updated EPG data.

III. Example Operations

Computing system 200, computing system 400, components of computing system 200, and/or components of computing system 400 can be configured to perform one or more operations. Examples of these operations and related features will now be described.

A. Operations Related to Identifying a Portion of Video Content

Figure 5:
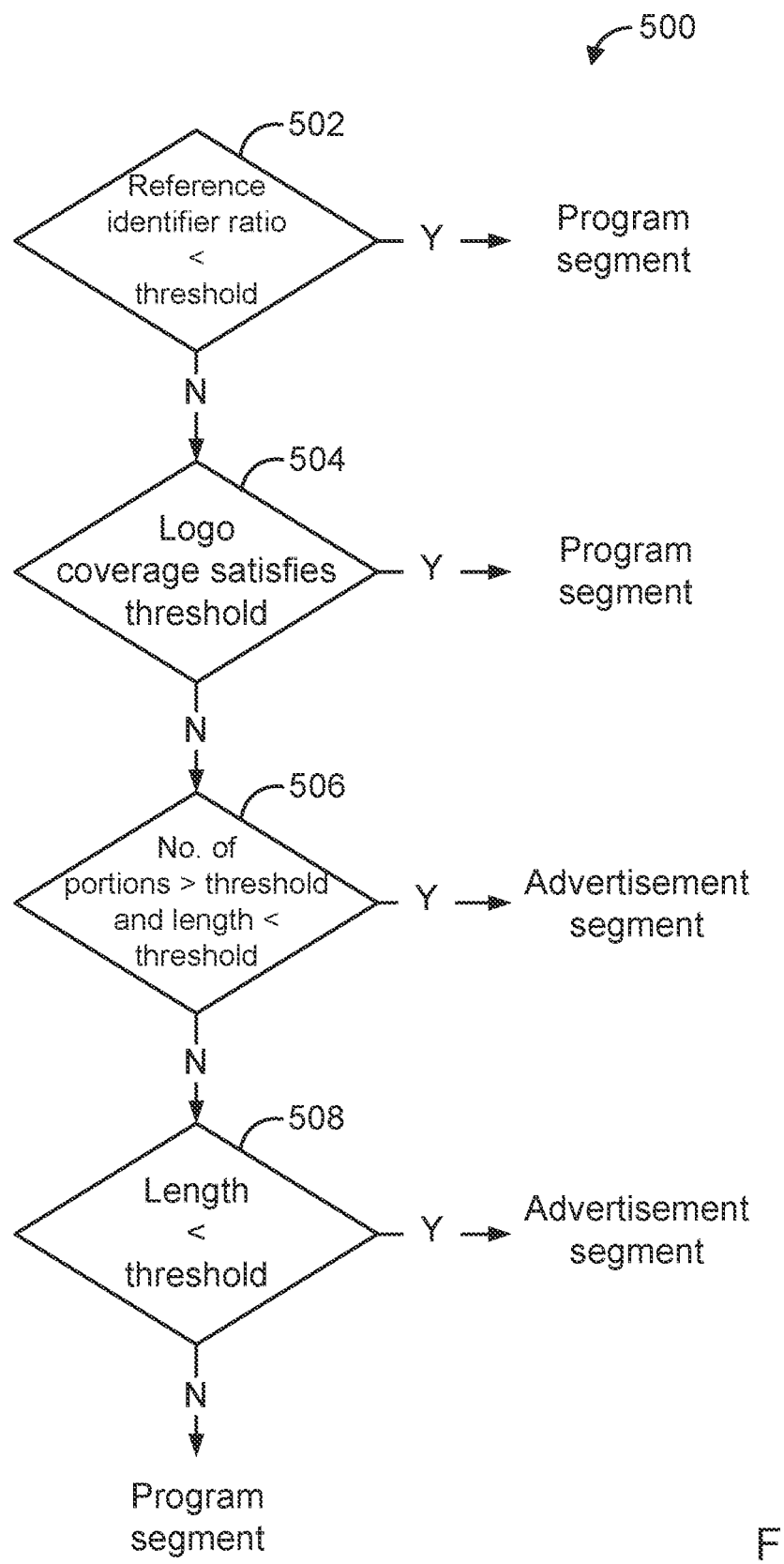
FIG. 5 shows an example process for identifying a portion of video content.

FIG. 5 shows an example process 500 for identifying a portion of video content. Process 500 can be carried out by a segment identifier, such as segment identifier 202 of FIG. 2, segment identifier 300 of FIG. 3, or segment identifier 402 of FIG. 4, or, more generally, by a computing system. As shown in FIG. 5, at block 502, process 500 includes determining whether a reference identifier ratio is less than a threshold. As noted above, the fingerprint repetition data for a portion of video content can include a list of other portions of video content matching a portion of video content as well as reference identifiers for the other portions of video content. The reference identifier ratio for a portion of video content is a ratio of i) the number of unique reference identifiers within a list of other portions of video content matching the portion of video content relative to ii) the total number of reference identifiers within the list of other portions of video content.

As an example, a list of other portions of video content matching a portion of video content may include ten other portions of video content. Each of the ten other portions can have a reference identifier, such that the total number of reference identifiers is also ten. However, the ten reference identifiers might include a first reference identifier, a second reference identifier that is repeated four times, and a third reference identifier that is repeated five times, such that there are just three unique reference identifiers. With this example, the reference identifier ratio is three to ten, or 0.3 when expressed in decimal format.

Determining whether a reference identifier ratio is less than the threshold can involve comparing the reference identifier ratio in decimal format to a threshold. Based on determining that a reference identifier ratio for the portion is less than a threshold, the computing system can identify the portion as a program segment. Whereas, based on determining that the reference identifier ratio is not less than the threshold, process 500 can proceed to block 504.

At block 504, the computing system can determine whether logo coverage data for the portion satisfies a threshold. The logo coverage data is indicative of a percent of time that a logo overlays the portion of video content. Determining whether the logo coverage data satisfies a threshold can involve determining whether a percent of time that a logo overlays the portion is greater than a threshold (e.g., ninety percent, eighty-five percent, etc.).

One example of a logo is a television station logo. The logo coverage data for the portion of video content can be derived using a logo detection module. The logo detection module can use any of a variety of logo detection techniques to derive the logo coverage data, such as fingerprint matching to a set of known channel logos or use of a neural network that is trained to detect channel logos. Regardless of the manner in which the logo coverage data is generated, the logo coverage data can be stored in a logo coverage database. Given a portion of video content to be analyzed, the computing system can retrieve logo coverage data for the portion of video content from the logo coverage database.

Based on determining that the logo coverage data for the portion satisfies the threshold, the computing system can identify the segment as a program segment. Whereas, based on determining that the logo coverage data does not satisfy the threshold, process 500 can proceed to block 506.

At block 506, the computing system can determine whether a number of other portions of video content matching the portion of video content is greater than a threshold number and a length of the portion of video content is less than a first threshold length (such as fifty seconds, seventy-five seconds, etc.). Based on determining that the number of other portions is greater than the threshold number and the length of the portion is less than the first threshold length, the computing system can identify the portion as an advertisement segment. Whereas, based on determining that the number of other portions is not greater than the threshold or the length is not less than the first threshold length, process 500 can proceed to block 508.

At block 508, the computing system can determine whether the length of the portion is less than a second threshold length. The second threshold length can be the same as the first threshold length. Alternatively, the second threshold length can be less than first threshold length. For instance, the first threshold length can be ninety seconds and the second threshold length can be forty-five seconds. In some instances, the second threshold length can be greater than the first threshold length.

Based on determining that the length of the portion is less than the second threshold length, the computing system can identify the portion as an advertisement segment. Whereas, based on determining that the length of the portion is not less than the second threshold length, the computing system can identify the portion as a program segment.

Figure 6:
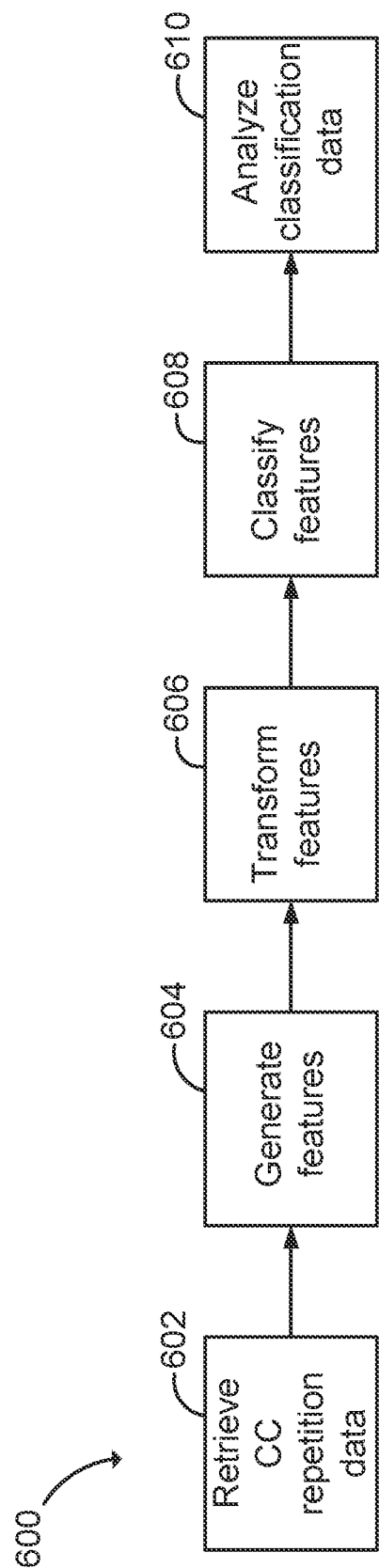
FIG. 6 shows another example process for identifying a portion of video content.

FIG. 6 shows another example process 600 for identifying a portion of video content. Process 600 can be carried out by a segment identifier, such as segment identifier 202 of FIG. 2, segment identifier 300 of FIG. 3, or segment identifier 402 of FIG. 4, or, more generally, by a computing system. As shown in FIG. 6, at 602, process 600 includes retrieving closed captioning repetition data and, at 604, process 600 includes generating features from closed captioning repetition data. The computing system can generate features in various ways. For instance, the closed captioning may correspond to a five-second portion and includes multiple lines of closed captioning. Each line of closed captioning can have corresponding closed captioning repetition data retrieved from a text index. The closed captioning repetition data can include, for each line: a count, a number of days on which the line occurs, and/or a number of channels on which the line occurs. The computing system can use the counts to generate features. Example features include: the counts, an average count, an average number of days, and/or an average number of channels. Optionally, the computing system can generate features from the closed captioning.

At 606, process 600 includes transforming the features. The features to be transformed can include the features generated at 604. In addition, the features can include lines of closed captioning and/or raw closed captioning repetition data. In sum, the features to be transformed can include one or any combination of lines of closed captioning, raw closed captioning repetition data, features derived from lines of closed captioning, and features derived from closed captioning repetition data.

Transforming the features can involve transforming the generated features to windowed features. Transforming the generated features to windowed features can include generating windowed features for sub-portions of the portion. For example, for a five-second portion, a three-second window can be used. With this approach, a first set of windowed features can be obtained by generating features for the first three seconds of the portion, a second set of windowed features can be obtained by generating features for the second, third, and fourth seconds of the portion, and a third set of windowed features can be obtained by generating features for the last three seconds of the portion. Additionally or alternatively, generating features can include normalizing the features.

As further shown in FIG. 6, at 608, process 600 includes classifying the features. By way of example, the features can be provided as input to a classification model. The classification model can be configured to output classification data indicative of a likelihood of the features being characteristic of a program segment and/or a likelihood of the features being characteristic of an advertisement segment. For instance, the classification model can output a probability that the features are characteristic of a program segment and/or a probability that the features are characteristic of an advertisement segment.

In line with the discussion above, the classification model can take the form of a neural network. For instance, the classification model can include a recurrent neural network, such as a long short-term memory (LSTM). Alternatively, the classification model can include a feedforward neural network.

At 610, process 600 includes analyzing the classification data. For instance, the computing system can use the classification data output by the classification model to determine whether the portion is a program segment and/or whether the segment is an advertisement segment.

By way of example, determining whether the portion is a program segment can involve comparing the classification data to a threshold. In an example in which multiple sets of windowed features are provided as input to the classification model, the classification model can output classification data for each respective set of windowed features. Further, the computing system can then aggregate the classification data to determine whether the portion is a program segment. For instance, the computing system can average the probabilities, and determine whether the average satisfies a threshold. As another example, the computing system can compare each individual probability to a threshold, determine whether more probabilities satisfy the threshold or more probabilities do not satisfy the threshold, and predict whether the portion is a program segment based on whether more probabilities satisfy the threshold or more probabilities do not satisfy the threshold. In a similar manner, the computing system can compare one or more probabilities to a threshold to determine whether the portion is an advertisement segment.

B. Example Method

Figure 7:
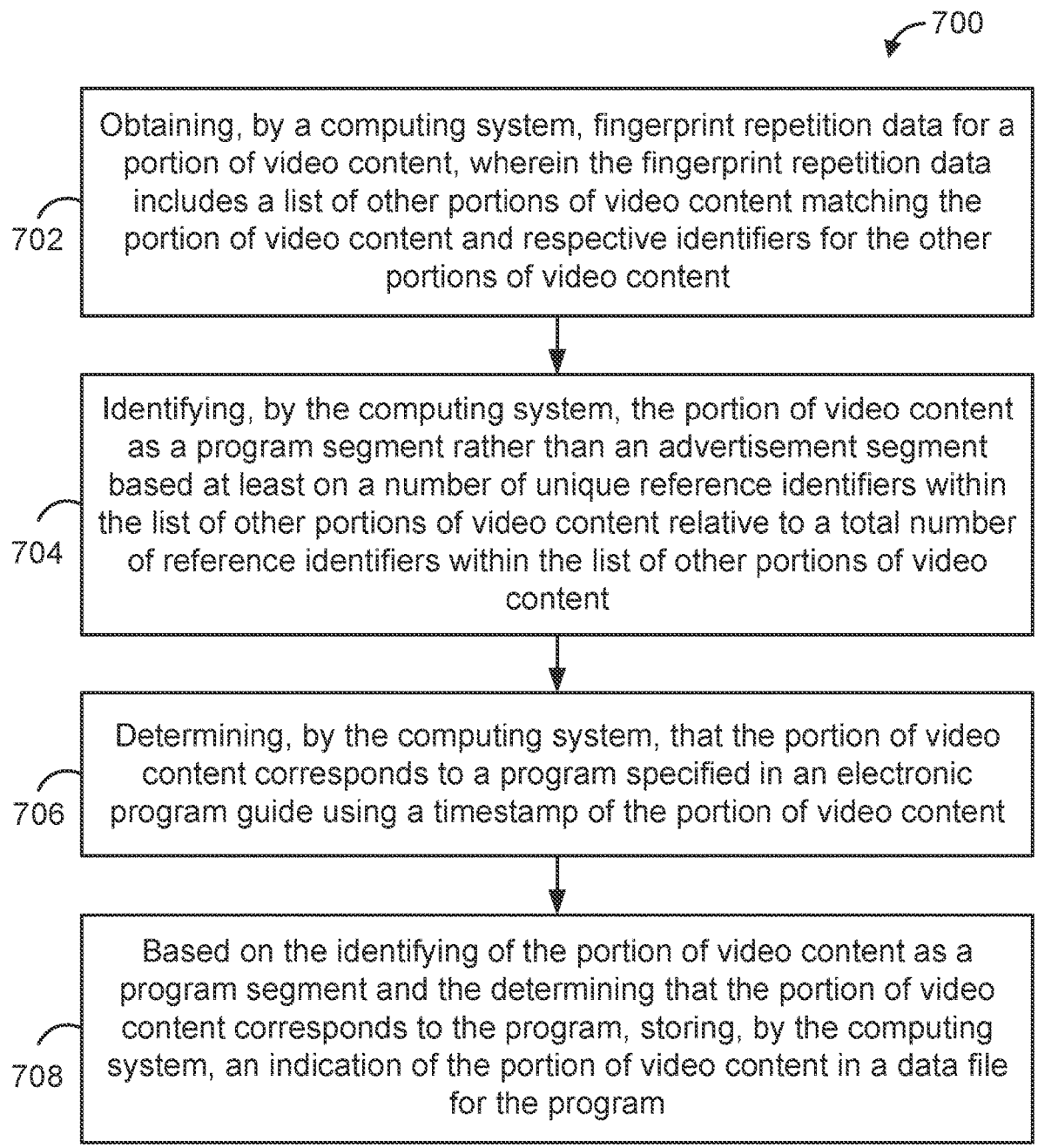
FIG. 7 is a flow chart of an example method.

FIG. 7 is a flow chart of an example method 700. Method 700 can be carried out by a computing system, such as computing system 200 of FIG. 2 or computing system 400 of FIG. 4. At block 702, method 700 includes obtaining, by a computing system, fingerprint repetition data for a portion of video content. The fingerprint repetition data includes a list of other portions of video content matching the portion of video content and respective identifiers for the other portions of video content. At block 704, method 700 includes identifying, by the computing system, the portion of video content as a program segment rather than an advertisement segment based at least on a number of unique reference identifiers within the list of other portions of video content relative to a total number of reference identifiers within the list of other portions of video content. At block 706, method 700 includes determining, by the computing system, that the portion of video content corresponds to a program specified in an electronic program guide using a timestamp of the portion of video content. And at block 708, method 700 includes, based on the identifying of the portion of video content as a program segment and the determining that the portion of video content corresponds to the program, storing, by the computing system, an indication of the portion of video content in a data file for the program.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    obtaining, by a computing system, fingerprint repetition data for a portion of video content, wherein the fingerprint repetition data comprises a list of other portions of video content matching the portion of video content and respective reference identifiers for the other portions of video content, each reference identifier corresponding to a respective different time the other portion of video content was presented;
    identifying, by the computing system, the portion of video content as a program segment rather than an advertisement segment based at least on a number of unique reference identifiers within the list of other portions of video content relative to a total number of reference identifiers within the list of other portions of video content, wherein the total number of reference identifiers within the list of other portions of video content further includes a plurality of reference identifiers that are the same;
    determining, by the computing system, that the portion of video content corresponds to a program specified in an electronic program guide using a timestamp of the portion of video content; and
    based on the identifying of the portion of video content as a program segment and the determining that the portion of video content corresponds to the program, storing, by the computing system, an indication of the portion of video content in a data file for the program.

2. The method of claim 1, wherein obtaining the fingerprint repetition data comprises searching for matches to fingerprints of the portion of video content within a video database so as to obtain the list of other portions of video content.

3. The method of claim 1, wherein identifying the portion of video content as a program segment rather than an advertisement segment based at least on the number of unique reference identifiers relative to the total number of reference identifiers comprises determining that a ratio of the number of unique reference identifiers to the total number of reference identifiers satisfies a threshold.

4. The method of claim 1, further comprising obtaining logo coverage data for the portion of video content,
wherein the logo coverage data is indicative of a percent of time that a logo overlays the portion of video content, and
wherein the identifying the portion of video content as a program segment rather than an advertisement segment is further based on the logo coverage data.

5. The method of claim 4, wherein the identifying the portion of video content as a program segment rather than an advertisement segment is further based on a number of portions of video content in the list of other portions of video content and a length of the portion of video content.

6. The method of claim 1, further comprising:
obtaining transition data for a section of video content that includes the portion of video content; and
identifying boundaries of the portion of video content using the transition data.

7. The method of claim 1, further comprising after identifying the portion of video content as a program segment, merging the portion of video content with an adjacent portion of video content that is identified as a program segment.

8. The method of claim 7, wherein merging the portion of video content with the adjacent portion of video content comprises:
obtaining a first list of matching portions for the portion of video content;
obtaining a second list of matching portions for the adjacent portion of video content;
identifying correspondences between the first list and the second list using timestamps for matching portions of the first list of matching portions and timestamps for matching portions of the second list of matching portions; and
based on the correspondences, merging the portion of video content with the adjacent portion of video content.

9. The method of claim 1, further comprising generating a copy of the program using the data file for the program.

10. The method of claim 1, further comprising obtaining closed captioning repetition data for the portion of video content,
wherein the identifying the portion of video content as a program segment rather than an advertisement segment is further based on the closed captioning repetition data.

11. The method of claim 10, further comprising:
generating features using the closed captioning repetition data; and
providing the features as input to a classification model, wherein the classification model is configured to output classification data indicative of a likelihood of the features being characteristic of a program segment,
wherein the identifying the portion of video content as a program segment rather than an advertisement segment is further based on the classification data.

12. The method of claim 1, further comprising:
obtaining fingerprint repetition data for another portion of video content;
identifying the other portion of video content as an advertisement segment rather than a program segment using the fingerprint repetition data;
identifying metadata for the other portion of video content; and
storing an indication of the other portion of video content and the metadata in another data file.

13. A non-transitory computer-readable medium having stored thereon program instructions that upon execution by a processor, cause performance of a set of acts comprising:
obtaining fingerprint repetition data for a portion of video content, wherein the fingerprint repetition data comprises a list of other portions of video content matching the portion of video content and respective reference identifiers for the other portions of video content, each reference identifier corresponding to a respective different time the other portion of video content was presented;
identifying the portion of video content as a program segment rather than an advertisement segment based at least on a number of unique reference identifiers within the list of other portions of video content relative to a total number of reference identifiers within the list of other portions of video content, wherein the total number of reference identifiers within the list of other portions of video content further includes a plurality of reference identifiers that are the same;
determining that the portion of video content corresponds to a program specified in an electronic program guide using a timestamp of the portion of video content; and
based on the identifying of the portion of video content as a program segment and the determining that the portion of video content corresponds to the program, storing an indication of the portion of video content in a data file for the program.

14. The non-transitory computer-readable medium of claim 13, wherein obtaining the fingerprint repetition data comprises searching for matches to fingerprints of the portion of video content within a video database so as to obtain the list of other portions of video content.

15. The non-transitory computer-readable medium of claim 13, wherein identifying the portion of video content as a program segment rather than an advertisement segment based at least on the number of unique reference identifiers relative to the total number of reference identifiers comprises determining that a ratio of the number of unique reference identifiers to the total number of reference identifiers satisfies a threshold.

16. A computing system configured for performing a set of acts comprising:
obtaining fingerprint repetition data for a portion of video content, wherein the fingerprint repetition data comprises a list of other portions of video content matching the portion of video content and respective reference identifiers for the other portions of video content, each reference identifier corresponding to a respective different time the other portion of video content was presented;
identifying the portion of video content as a program segment rather than an advertisement segment based at least on a number of unique reference identifiers within the list of other portions of video content relative to a total number of reference identifiers within the list of other portions of video content, wherein the total number of reference identifiers within the list of other portions of video content further includes a plurality of reference identifiers that are the same;

determining that the portion of video content corresponds to a program specified in an electronic program guide using a timestamp of the portion of video content; and based on the identifying of the portion of video content as a program segment and the determining that the portion of video content corresponds to the program, storing an indication of the portion of video content in a data file for the program.

17. The computing system of claim 16, wherein obtaining the fingerprint repetition data comprises searching for matches to fingerprints of the portion of video content within a video database so as to obtain the list of other portions of video content.

18. The computing system of claim 16, wherein identifying the portion of video content as a program segment rather than an advertisement segment based at least on the number of unique reference identifiers relative to the total number of reference identifiers comprises determining that a ratio of the number of unique reference identifiers to the total number of reference identifiers satisfies a threshold.

19. The computing system of claim 16, wherein:
the set of acts further comprises obtaining logo coverage data for the portion of video content,
the logo coverage data is indicative of a percent of time that a logo overlays the portion of video content, and
the identifying the portion of video content as a program segment rather than an advertisement segment is further based on the logo coverage data.

20. The computing system of claim 16, wherein the set of acts further comprises:
obtaining transition data for a section of video content that includes the portion of video content; and
identifying boundaries of the portion of video content using the transition data.

* * * * *